United States Patent Office 2,894,946
Patented July 14, 1959

2,894,946

2-AROYLMETHYL-3-OXO-3,4-DIHYDRO-1,4,2-BENZOTHIAZINES AND THEIR PREPARATION

Frederick K. Kirchner, Delmar, N.Y., assignor to Sterling Drug Inc., New York, N.Y., a corporation of Delaware No Drawing. Application June 20, 1956
Serial No. 592,483

16 Claims. (Cl. 260—243)

This invention relates to processes for the preparation of substituted benzothiazines. It is more particularly concerned with the preparation of 2-aroylmethyl-3-oxo-3,4-dihydro-1,4,2-benzothiazines and the novel 2-aroylmethyl - 3 - oxo - 3,4 - dihydro - 1,4,2 - benzothiazines produced thereby.

Although relatively few have been reported, methods for preparing benzothiazines substituted in the 2-position by lower-alkanoyl and aroyl radicals are known. Thus 2 - benzoyl - 3 - oxo - 3,4 - dihydro - 1,4,2 - benzothiazine has been prepared from 2,2'-diaminodiphenyl disulfide and ethylbenzoyl acetate. Other 2-substituted benzothiazines have been prepared from 2-aminobenzenethiol and α,β-unsaturated acids, ketones, and α-halogenated acids. All these methods suffer from several disadvantages. The yields are low, mixtures are obtained, the reaction conditions are drastic and the course of the reaction is not predictable. For example in the case of α,β-unsaturated acids, the sulfur containing portion of 2-aminobenzenethiol adds to the ethylenic linkage with the sulphur becoming attached to the β-carbon atom. This is followed by ring closure to give seven-membered rings. The reaction conditions are very critical as evidenced by the fact that heptabenzothiazines, benzothiazines or benzothiazoles can result depending on the temperature employed in carrying out the reaction. Only in the special case of maleic acid is a benzothiazine formed initially due to the fact that one of the two carboxyl groups is in a position to react with the amino group to form a normal six-membered ring.

Hitherto, no compositions having the formula I have been reported. Therefore, it is the principal object of this invention to provide a method for preparing 2-aroylmethyl - 3 - oxo - 3,4 - dihydro - 1,4,2 - benzothiazines in a predictable manner and in good yields.

A further object of the invention is to provide a method for preparing 2-aroylmethyl-3-oxo-3,4-dihydro-1,4,2-benzothiazines which involves lower temperatures and shortened reaction times than the methods now known for the preparation of the benzothiazine ring system.

Still another object of the invention is to provide new compounds having a surprisingly high activity as antifungal agents.

I have now found that 2-aminobenzenethiol adds to a β-aroylacrylic acid in such a way that the sulfur-containing portion of the molecule adds the carbon atom beta to the carbonyl group and alpha to the carboxyl group. This is followed by the removal of water between the carboxyl group and the amino group to form a 2-aroylmethyl-3-oxo-3,4-dihydro-1,4,2-benzothiazine.

The present invention provides a method of preparing new and useful compounds in which the 3-oxo-3,4-dihydro-1,4,2-benzothiazine nucleus is attached through the 2-position by a methylene bridge to the carbonyl carbon of an aroyl radical.

The present invention affords new compounds having the formula

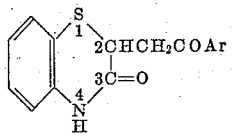

I wherein Ar is an aryl radical of the benzene series. A preferred group of aryl radicals consists of the unsubstituted phenyl radical and phenyl radicals substituted by from one to three radicals selected from the group consisting of alkyl, lower-alkoxy, lower-alkylmercapto, lower-alkylsulfonyl, amino, lower-acylamino, nitro, halogen and hydroxy. These substituents can be in any of the available positions of the phenyl nucleus, and where more than one, can be the same or different and can be in any of the various position combinations relative to each other. The lower-alkoxy, lower-alkylmercapto, lower-alkylsulfonyl and lower-acylamino substituents have preferably one to six carbon atoms, including such substituents as: methoxy, ethoxy, n-propoxy, isopropoxy, isobutoxy, n-pentoxy, n-hexoxy and the like for lower-alkoxy; methylmercapto, ethylmercapto, n-propylmercapto, isobutylmercapto, n-hexylmercapto, and the like for lower-alkylmercapto; methylsulfonyl, ethylsulfonyl, n-propylsulfonyl, isopropylsulfonyl, n-butylsulfonyl, n-pentylsulfonyl, isohexylsulfonyl and the like for lower-alkylsulfonyl; and acetylamino, propionylamino, isopropionylamino, butyrylamino, isobutyrylamino, valerylamino, caproylamino and the like for lower acylamino. The alkyl substituents have preferably from one to twelve carbon atoms, including such substituents as methyl, ethyl, propyl, isopropyl, butyl, isobutyl, pentyl, hexyl, isohexyl, heptyl, isoheptyl, octyl, nonyl, decyl, undecyl, dodecyl and the like. The halogen atom can be any of the halogens fluorine, chlorine, bromine or iodine.

Of the compounds prepared by the process of the invention, those having antifungal activity are of particular value. Included in this preferred aspect are compounds of Formula I above in which Ar is a phenyl radical substituted by from one to three radicals selected from the group consisting of alkyl, lower-alkoxy, lower-alkylmercapto, lower-alkylsulfonyl, amino, lower-acylamino, nitro, halogen and hydroxy and where the groups have the meanings given above.

The compounds of Formula I above in which Ar is a phenyl radical substituted by from one to three halogen atoms have high antifungal activity in vitro against genera such as Tricophyton and Aspergillus and as such constitute an especially preferred class.

The process of the invention is carried out by reacting a β-benzoylacrylic acid with about a one molar equivalent of 2-aminobenzenethiol at a temperature between about 25° C. and 150° C. The reaction is preferably carried out in a solvent inert under the conditions of the reaction. Such solvents include aromatic hydrocarbons e.g. benzene, toluene, xylene etc.; aliphatic hydrocarbons such as hexane, heptane, octane etc.; chlorinated hydrocarbons such as methylene dichloride, chloroform, carbon tetrachloride etc.; and ethers such as diethyl ether, di-n-butyl ether, tetrahydrofuran etc.

The reaction proceeds at room temperature in diethyl ether but the best mode for carrying out the process comprises adding 2-aminobenzenethiol to a benzene, toluene or xylene solution of a β-benzoylacrylic acid at 50–125° C. Under these conditions, the reaction is immediate and the 2-aroylmethyl-3-oxo-3,4-dihydro-1,4,2-benzothiazine is recovered by cooling the reaction mixture. Although the reaction can be carried out in the presence of water, it is preferred to conduct the reaction by heating the reactants in a steam-volatile, water-immiscible solvent while removing the water formed by azeotropic distillation. The separation of water commences as soon as the addition of 2-aminobenzenethiol is begun and ceases when the addition is complete. The reaction is essentially complete at this stage but the reaction mixture can be refluxed to insure complete reaction.

In a modification of the process of the invention a method is provided for preparing compounds having the Formula II

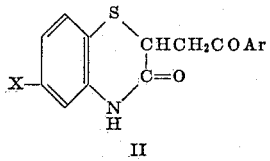

II wherein Ar has the meaning given above and X is a halogen atom. The halogen atom can be any of the halogens, fluorine, chlorine, bromine and iodine.

The process is carried out by condensing a 4-halogen-substituted-2-nitrothiophenol with the appropriate β-benzoylacrylic acid and reducing the resultant product with an agent effective to reduce a nitro to an amino group. The intermediate 2-(4-halo-3-nitrophenylmercapto)-3-(aroyl)propionic acid can be isolated and characterized although it is preferred to carry out the reaction in one step without the isolation of any intermediates. Although I prefer to use zinc and acetic acid as the reducing agent, this is not a critical step and numerous reducing agents effective in reducing nitro to amino groups can be used.

Thus, the processes for preparing compounds of Formulas I and II proceed in essentially the same manner e.g., the sulfur containing residue adds across the double bond of a β-benzoylacrylic acid and ring closure to the desired compounds follows. In the process for preparing compounds of Formula II it is, of course, necessary to reduce the nitro group to an amino group before ring closure is effected.

The intermediate 4-halo-2-nitrothiophenols are a known class of compounds. They can be prepared by reacting a 2,5-dihalonitrobenzene with sodium sulfide.

The intermediate β-benzoylacrylic acids are a known class of compounds. They can be prepared by reacting maleic anhydride with the appropriate substituted benzene in the presence of aluminum chloride.

The following examples will further illustrate the invention, without however limiting the same thereto.

EXAMPLE 1

2-phenacyl-3-oxo-3,4-dihydro-1,4,2-benzothiazine

In a 1 liter three-necked flask fitted with a Dean-Stark water separator and dropping funnel was placed 37 grams of β-benzoylacrylic acid in 200 ml. of dry toluene. The mixture was heated to dissolve the β-benzoylacrylic acid and heating was continued until reflux commenced. To the refluxing solution was added dropwise 25 grams of 2-aminobenzenethiol in 100 ml. of dry toluene. The reaction was instantaneous as evidenced by the immediate accumulation of water in the Dean-Stark trap. The separation of water ceased after the addition of the toluene solution of 2-aminobenzenethiol. The solution was refluxed for one hour then poured into an Erlenmeyer flask and cooled. The crystals which separated were collected by suction filtration, washed with toluene and Skellysolve C. After recrystallization from toluene there was obtained 45 grams of 2-phenacyl-3-oxo-3,4-dihydro-1,4,2-benzothiazine, M.P. 172.9–175.0° C. (corr.).

Analysis.—Calc'd for $C_{16}H_{13}NO_2S$: Nitrogen 4.94; sulfur 11.32. Found: Nitrogen 4.94; sulfur 10.95.

2 - phenacyl - 3 - oxo - 3,4 - dihydro - 1,4,2 - benzothiazine oxime was prepared from 2-phenacyl - 3 - oxo-3,4 - dihydro - 1,4,2 - benzothiazine and hydroxylamine hydrochloride. The 2-phenacyl - 3 - oxo - 3,4 - dihydro-1,4,2 - benzothiazine oxime thus obtained had the M.P. 196–201.0° C. (corr.).

Analysis.—Calc'd for $C_{16}H_{14}N_2O_2S$: Nitrogen 9.39; sulfur 10.74. Found: Nitrogen 9.04; sulfur 10.51.

When mixed with benzenesulfonyl chloride, 2-phenacyl - 3 - oxo - 3,4 - dihydro - 1,4,2 - benzothiazine oxime underwent a Beckmann rearrangement to give 2-phenylcarbamylmethyl - 3 - oxo - 3,4 - dihydro - 1,4,2 - benzothiazine, a compound disclosed and claimed, and whose structure is proved in my co-pending application, Serial No. 592,489, filed June 20, 1956.

Thus, that the structure of the 2-aroylmethyl-3-oxo-3,4-dihydro-1,4,2-benzothiazines is as shown follows from the above-mentioned structure proof and chemical analysis.

EXAMPLE 2

2 - (4 - n - dodecylphenacyl) - 3 - oxo - 3,4 - dihydro-1,4,2-benzothiazine was prepared from 55 grams of β-(4-n-dodecylbenzoyl)acrylic acid and 20 grams of 2-aminobenzenethiol in 175 ml. of dry toluene according to the procedure described in Example 1. The 2-(4-n-dodecylphenacyl) - 3 - oxo - 3,4 - dihydro - 1,4,2 - benzothiazine thus obtained weighed 61 grams and had the M.P. 118–120.4° C. (corr.).

Analysis.—Calc'd for $C_{28}H_{37}NO_2S$: Nitrogen 3.10; sulfur 7.10. Found: Nitrogen 3.14; sulfur 6.79.

EXAMPLE 3

2 - (4 - n - octylphenacyl) - 3 - oxo - 3,4 - dihydro-1,4,2-benzothiazine was prepared from 35 grams of β-(4-n-octylbenzoyl)acrylic acid and 15.5 grams of 2-aminobenzenethiol in 150 ml. of dry toluene according to the procedure described in Example 1. The 2-(4-n-octylphenacyl) - 3 - oxo - 3,4 - dihydro - 1,4,2 - benzothiazine thus obtained had the M.P. 117.2–118.7° C. (corr.) and weighed 29.5 grams.

Analysis.—Calc'd for $C_{24}H_{29}NO_2S$: Nitrogen 3.54; sulfur 8.11. Found: Nitrogen 3.57; sulfur 7.99.

2 - (4 - n - octylphenacyl) - 3 - oxo - 3,4 - dihydro-1,4,2-benzothiazine was found to possess antifungal activity in vitro as follows:

| Organism | Maximum Effective Dilution | |
|---|---|---|
| | Fungistatic | Fungicidal |
| T. interdigitale | 1:133,000 | 1:133,000 |
| T. mentagrophytes | 1:133,000 | 1:133,000 |
| As. niger | 1:100,000 | 1:100,000 |
| T. gypseum | 1:100,000 | 1:100,000 |
| Monilia albicans | 1:100,000 | 1:100,000 |

EXAMPLE 4

2-(4-n-butylphenacyl)-3-oxo-3,4-dihydro- 1,4,2 - benzothiazine was prepared from 17.5 grams of β-(4-n-butylbenzoyl)acrylic acid and 10 grams of 2-aminobenzenethiol in 85 ml. of dry toluene according to the procedure described in Example 1. The 15 grams of 2-(4-n-butylphenacyl)-3-oxo-3,4-dihydro-1,4,2-benzothiazine thus obtained had the M.P. 131.1–131.8° C. (corr.).

Analysis.—Calc'd for $C_{20}H_{21}NO_2S$: Nitrogen 4.13; sulfur 9.44. Found: Nitrogen 4.20; sulfur 9.08.

EXAMPLE 5

2-(4-isopropylphenacyl)-3-oxo-3,4-dihyldro-1,4,2- benzothiazine was prepared from 10.5 grams of β-(4-isopropylbenzoyl)acrylic acid and 6.1 grams of 2-aminobenzenethiol in 65 ml. of dry toluene according to the procedure described in Example 1. The 2-(4-isopropylphenacyl)-3-oxo-3,4-dihydro-1,4,2-benzothiazine thus obtained weighed 6 grams and had the M.P. 157.4–159° C. (corr.).

Analysis.—Calc'd for $C_{19}H_{19}NO_2S$: Nitrogen 4.30; sulfur 9.85. Found: Nitrogen 4.35; sulfur 9.80.

EXAMPLE 6

2-(4-methylphenacyl) - 3-oxo-3,4-dihydro-1,4,2 - benzothiazine was prepared from 27.8 grams of β-(4-methylbenzoyl)acrylic acid and 18.5 grams of 2-aminobenzenethiol in 130 ml. of dry toluene according to the procedure described in Example 1. The 33.7 grams of 2-(4-methylphenacyl)-3-oxo-3,4-dihydro - 1,4,2 - benzothiazine thus obtained had the M.P. 204.8–206.3° C. (corr.).

*Analysis.*—Calc'd for $C_{17}H_{15}NO_2S$: Nitrogen 4.71; sulfur 10.78. Found: Nitrogen 4.78; sulfur 11.20.

EXAMPLE 7

2-(4-methoxyphenacyl) - 3-oxo-3,4-dihydro-1,4,2 - benzothiazine was prepared from 19 grams of β-(4-methoxybenzoyl)acrylic acid and 12 grams of 2-aminobenzenethiol in 150 ml. of dry toluene according to the procedure described in Example 1. The 29 grams of 2-(4-methoxyphenacyl)3-oxo-3,4-dihydro-1,4,2-benzothiazine thus obtained had the M.P. 194.4–196.2° C. (corr.).

*Analysis.*—Calc'd for $C_{17}H_{15}NO_3S$: Nitrogen 4.47; sulfur 10.23. Found: Nitrogen 4.55; sulfur 10.01.

EXAMPLE 8

2-(4-chlorophenacyl)-3-oxo-3,4-dihydro-1,4,2-benzothiazine was prepared from 21 grams of β-(4-chlorobenzoyl)acrylic acid and 14 grams of 2-aminobenzenethiol in 200 ml. of dry toluene according to the procedure described in Example 1. The 24.3 grams of 2-(4-chlorophenacyl)-3-oxo-3,4-dihydro-1,4,2-benzothiazine thus obtained had the M.P. 193.1–195.2° C. (corr.).

*Analysis.*—Calc'd for $C_{16}H_{12}ClNO_2S$: Chlorine 11.16; sulfur 10.09. Found: Chlorine 10.85; sulfur 10.29.

2-(4-chlorophenacyl)-3-oxo-3,4-dihydro-1,4,2-benzothiazine was found to possess antifungal activity in vitro as follows:

| Organism | Maximum Effective Dilution | |
|---|---|---|
| | Fungistatic | Fungicidal |
| T. interdigitale | 1:100,000 | 1:66,000 |
| T. mentagrophytes | 1:100,000 | 1:66,000 |
| As. niger | 1:66,000 | <1:50,000 |
| T. gypseum | 1:100,000 | 1:50,000 |
| M. albicans | 1:66,000 | <1:50,000 |

EXAMPLE 9

*2-phenacyl-3-oxo-6-chloro-3,4-dihydro-1,4,2-benzothiazine*

A suspension of 19 grams of 4,4'-dichloro-2-2'-dinitrodiphenyldisulfide was mixed with a solution of 7.0 grams of sodium sulfide nonahydrate and 3 grams of sodium hydroxide in 25 ml. of water. The mixture was heated for fifteen minutes then 50 ml. of water added. The hot solution was filtered and the hot filtrate diluted with water and acidified with dilute hydrochloric acid. The solid 2-nitro-4-chlorothiophenol which separated was collected by suction filtration, washed with water and pressed dry. This compound was used without further purification in the following preparation.

The 2-nitro-4-chlorothiophenol obtained as described above was added to a hot solution of β-benzoylacrylic acid in 600 ml. of glacial acetic acid and the mixture heated until solution was complete. To the warm solution was added in small quantities, 30 grams of zinc dust. Heating was discontinued while the zinc was being added since an exothermic reaction took place. After the addition was complete 200 ml. of glacial acetic acid was added and the suspension heated to reflux then filtered while hot to remove unreacted zinc. Cooling of the filtrate caused the separation of a white solid which was collected by suction filtration. Recrystallization from toluene gave 6 grams of 2-phenacyl-3-oxo-6-chloro-3,4-dihydro-1,4,2-benzothiazine, M.P. 215–219° C. (corr.).

*Analysis.*—Calc'd for $C_{16}H_{12}ClNO_2S$: Nitrogen 4.41; sulfur 10.09. Found: Nitrogen 4.31; sulfur 10.22.

Using the manipulative procedure described above 2-(4-n-octylphenacyl)-3-oxo-6-bromo-3,4-dihydro-1,4,2 - benzothiazine can be prepared by reacting β-(4-n-octylbenzoyl)acrylic acid with 2-nitro-4-bromothiophenol; 2-(2,4-dichlorophenacyl) - 3-oxo-6-iodo-3,4-dihydro-1,4,2 - benzothiazine can be prepared by reacting β-(2,4-dichlorobenzoyl)acrylic acid with 4,4'-diiodo-2,2'-dinitrodiphenyldisulfide which can be prepared by nucleophilic displacement of the chlorine atom of 2-chloro-5-iodonitrobenzene with sodium sulfide; 2-phenacyl-3-oxo-6-fluoro-3,4-dihydro-1,4,2-benzothiazine can be prepared by reacting β-benzoylacrylic acid with 2-mercapto-5-fluoronitrobenzene which can be prepared by nucleophilic displacement of the 2-fluorine atom of 2,5-difluoronitrobenzene with sodium sulfide; and 2-(2,4,6-trimethylphenacyl)-3-oxo-6-chloro-3,4-dihydro-1,4,2-benzothiazine can be prepared by reacting β-(2,4,6-trimethylbenzoyl)acrylic acid with 2-nitro-4-chlorothiophenol.

EXAMPLE 10

2-(3,4-dichlorophenacyl)-3-oxo-3,4-dihydro-1,4,2 - benzothiazine was prepared from 15 grams of β-(3,4-dichlorobenzoyl)acrylic acid and 8.2 grams of 2-aminobenzenethiol in 175 ml. of dry toluene according to the procedure described in Example 1. There was thus obtained 12 grams of 2-(3,4-dichlorophenacyl)-3-oxo-3,4-dihydro-1,4,2-benzothiazine, M.P. 192.3–194.0° C. (corr.).

*Analysis.*—Calc'd for $C_{16}H_{11}Cl_2NO_2S$: Nitrogen 3.98; chlorine 20.13. Found: Nitrogen 4.14; chlorine 20.05.

2-(3,4-dichlorophenacyl)-3-oxo-3,4-dihydro-1,4,2 - benzothiazine was found to possess antifungal activity in vitro as follows:

| Organism | Maximum Effective Dilution | |
|---|---|---|
| | Fungistatic | Fungicidal |
| T. interdigitale | 1:66,000 | 1:66,000 |
| T. mentagrophytes | 1:100,000 | 1:50,000 |
| As. niger | 1:66,000 | <1:50,000 |
| T. gypseum | 1:100,000 | 1:60,000 |
| M. albicans | 1:66,000 | <1:50,000 |

EXAMPLE 11

2-(3-nitrophenacyl)-3-oxo-3,4-dihydro-1,4,2 - benzothiazine was prepared from 6.5 grams of β-(3-nitrobenzoyl)-acrylic acid and 5 grams of 2-aminobenzenethiol in 110 ml. of dry benzene according to the procedure described in Example 1. The 5.5 grams of 2-(3-nitrophenacyl)-3-oxo-3,4-dihydro-1,4,2-benzothiazine thus obtained had the M.P. 190.5–193.7° C. (corr.).

*Analysis.*—Calc'd for $C_{16}H_{12}N_2O_4S$: Nitrogen$_{NO_2}$ 4.26; sulfur 9.76. Found: Nitrogen 4.26; sulfur 9.64.

2-(3-nitrophenacyl)-3-oxo-3,4-dihydro-1,4,2 - benzothiazine was found to possess antifungal activity in vitro as follows:

| Organism | Maximum Effective Dilution | |
|---|---|---|
| | Fungistatic | Fungicidal |
| T. interdigitale | 1:20,000 | 1:13,000 |
| T. mentagrophytes | 1:20,000 | 1:10,000 |
| As. niger | 1:13,000 | <1:10,000 |
| T. gypseum | 1:13,000 | <1:10,000 |
| M. albicans | 1:13,000 | 1:13,000 |

EXAMPLE 12

*2-(4-chloro-2-nitrophenylmercapto)-3-(4-fluorobenzoyl)-propionic acid*

2-nitro-4-chlorothiophenol, obtained as described in

Example 8A, was added to a hot solution of 15 grams of β-(4-fluorobenzoyl)acrylic acid in 200 ml. of glacial acetic acid. The mixture was heated with stirring and after fifteen minutes a yellow solid began to separate. After heating an additional fifteen minutes, the mixture was cooled in an ice bath and the crystals collected by suction filtration, washed with ethyl alcohol and absolute ether and dried at 75° C. A portion of the adduct thus obtained was used without further purification as described below. Recrystallization of another portion from methyl Cellosolve gave yellow crystals of 2-(4-chloro-2-nitrophenylmercapto)-3-(4-fluorobenzoyl)propionic acid, M.P. 207–208° C. (dec.) (corr.).

*Analysis.*—Calc'd for $C_{16}H_{11}ClFNO_5S$: Nitrogen 3.65; sulfur 8.35. Found: Nitrogen 3.60, sulfur 8.29.

2-(4-fluorophenacyl)-3-oxo-6-chloro-3,4-dihydro-1,4,2-benzothiazine

The crude 2-(4-chloro-2-nitrophenylmercapto)-3-(4-fluorobenzoyl)propionic acid obtained above was dissolved in 400 ml. of boiling glacial acetic acid and 15 grams of zinc dust added in small portions. The mixture was refluxed for thirty minutes, during which time the supernatant liquid became nearly colorless. Then the liquid was filtered by suction and then run in a thin stream into three liters of water causing the separation of an off-white precipitate which was collected by suction filtration. The solid was taken up in boiling glacial acetic acid, the solution treated with decolorizing charcoal and filtered. The hot filtrate was diluted with 50 ml. of water and allowed to cool. The solid product which separated was collected by suction filtration, washed with absolute ether and dried at 75° C. The 7 grams of 2-(4-fluorophenacyl)-3-oxo-6-chloro-3,4-dihydro-1,4,2-benzothiazine thus obtained had the M.P. 243–245° C. (corr.).

*Analysis.*—Calc'd for $C_{16}H_{11}ClFNO_2S$: Nitrogen 4.17; sulfur 9.55. Found: Nitrogen 3.97; sulfur 9.37.

2-(4-fluorophenacyl)-3-oxo-6-chloro-3,4-dihydro-1,4,2-benzothiazine was found to possess antifungal activity in vitro as follows:

| Organism | Maximum Effective Dilution | |
|---|---|---|
| | Fungistatic | Fungicidal |
| T. interdigitale | 1:100,000 | 1:50,000 |
| T. mentagrophytes | 1:66,000 | 1:50,000 |
| As. niger | 1:66,000 | 1:50,000 |
| T. gypseum | 1:50,000 | 1:50,000 |
| M. albicans | 1:50,000 | 1:50,000 |

According to the manipulative procedures described above 2-(4-chlorophenacyl)-3-oxo-6-fluoro-3,4-dihydro-1,4,2-benzothiazine can be prepared by reducing 2-(4-fluoro-2-nitrophenylmercapto)-3-(4-chlorobenzoyl)propionic acid with zinc; the intermediate 2-(4-fluoro-2-nitrophenylmercapto)-3-(4-chlorobenzoyl)propionic acid can be prepared by reacting 2-nitro-4-fluorothiophenol, prepared by reacting 2-chloro-5-fluoronitrobenzene with sodium sulfide, with β-(4-chlorobenzoyl)acrylic acid; 2-(3,4-dichlorophenacyl)-3-oxo-6-bromo-3,4-dihydro-1,4,2-benzothiazine can be prepared by reducing 2-(4-bromophenylmercapto)-3-(3,4-dichlorobenzoyl)propionic acid, prepared from 2-nitro-4-chlorothiophenol and β-(3,4-dichlorobenzoyl)acrylic acid, with zinc; and 2-(4-methoxyphenacyl)-3-oxo-6-iodo-3,4-dihydro-1,4,2-benzothiazine can be prepared by reducing 2-(4-iodo-2-nitrophenylmercapto)-3-(4-methoxybenzoyl)propionic acid, prepared by reacting 2,5-diiodonitrobenzene with sodium sulfide followed by condensation with β-(4-methoxybenzoyl)acrylic acid, with zinc.

EXAMPLE 13

2-(4-acetamidophenacyl)-3-oxo-3,4-dihydro-1,4,2-benzothiazine 2-(4-acetamidophenacyl)-3-oxo-3,4-dihydro-1,4,2-benzothiazine was prepared from 13 grams of β-(4-acetamidobenzoyl)acrylic acid and 7.5 grams of 2-aminobenzenethiol in 150 ml. of dry toluene according to the procedure described in Example 1. The 2-(4-acetamidophenacyl)-3-oxo-3,4-dihydro-1,4,2-benzothiazine thus obtained weighed 12 grams and had the M.P. 236.3–237.7° C. (corr.).

*Analysis.*—Calc'd for $C_{18}H_{16}N_2O_3S$: Nitrogen 8.23; sulfur 9.42. Found: Nitrogen 8.33; sulfur 9.54.

EXAMPLE 14

2-(4-aminophenacyl)-3-oxo-3,4-dihydro-1,4,2-benzothiazine

A suspension of 16.5 grams of 2-(4-acetamidophenacyl)-3-oxo-3,4-dihydro-1,4,2-benzothiazine (Example 13) in 500 ml. of absolute ethyl alcohol and 100 ml. of concentrated hydrochloric acid was refluxed for two hours then left standing over night. The crystals thus obtained were removed by suction filtration and suspended in 400 ml. of hot 95% ethyl alcohol. The hot solution was filtered, the filtrate diluted with 10 ml. of concentrated ammonium hydroxide and 400 ml. of water and the solution cooled in an ice bath. The solid material thus obtained was removed by suction filtration and dried at 75° C. to give 6.7 grams of 2-(4-aminophenacyl)-3-oxo-3,4-dihydro-1,4,2-benzothiazine M.P. 193.8–196.0° C. (corr.).

*Analysis.*—Calc'd for $C_{16}H_{15}N_2O_2S$: Nitrogen 9.36; sulfur 10.71. Found: Nitrogen 9.53; sulfur 11.15.

2-(4-aminophenacyl)-3-oxo-3,4-dihydro-1,4,2-benzothiazine was found to possess antifungal activity in vitro as follows:

| Organism | Maximum Effective Dilution | |
|---|---|---|
| | Fungistatic | Fungicidal |
| T. interdigitale | 1:20,000 | 1:13,000 |
| T. mentagrophytes | 1:20,000 | 1:10,000 |
| As. niger | 1:13,000 | 1:10,000 |
| T. gypseum | 1:20,000 | 1:10,000 |
| M. albicans | 1:13,000 | 1:10,000 |

EXAMPLE 15

2-(4-butyramidophenacyl)-3-oxo-3,4-dihydro-1,4,2-benzothiazine

A mixture of 4 grams of 2-(4-aminophenacyl)-3-oxo-3,4-dihydro-1,4,2-benzothiazine (Example 14), 3 grams of butyric anhydride and 20 ml. of pyridine was heated on a steam bath for 30 minutes. Addition of ice and water to the solution caused the separation of an oil that quickly solidified. The solid was collected by suction filtration, washed well with water then taken up in acetone. The acetone solution was filtered and the filtrate concentrated by the removal of acetone. The concentrate was taken up in water and again concentrated to yield 4 grams of 2-(4-butyramidophenacyl)-3-oxo-3,4-dihydro-1,4,2-benzothiazine M.P. 218.0–219.7° C. (corr.).

*Analysis.*—Calc'd for $C_{20}H_{20}N_2O_3S$: Nitrogen 7.61; sulfur 8.70. Found: Nitrogen 7.51; sulfur 8.86.

EXAMPLE 16

2-(4-hexanamidophenacyl)-3-oxo-3,4-dihydro-1,4,2-benzothiazine was prepared from 6 grams of 2-(4-aminophenacyl)-3-oxo-3,4-dihydro-1,4,2-benzothiazine (Example 14), 4.5 grams of caproic anhydride and 20 ml. of dry pyridine according to the procedure described in Example 13. There was thus obtained 6.5 grams of 2-(4-hexanamidiphenacyl)-3-oxo-3,4-dihydro-1,4,2-benzothiazine, M.P. 175–185.4° C. (corr.).

*Analysis.*—Calc'd for $C_{22}H_{24}N_2O_3S$: Nitrogen 7.07; sulfur 8.08. Found: Nitrogen 7.31; sulfur 8.12.

EXAMPLE 17

2-(4-fluorophenacyl)-3-oxo-3,4-dihydro-1,4,2-benzothiazine was prepared from 9.7 grams of β-(4-fluorobenzoyl)acrylic acid, prepared from 225 grams of fluorobenzene and 229 grams of maleic anhydride, M.P. 135.5–136.7° C. (corr.), and 7 grams of 2-aminobenzenethiol in 100 ml. of dry toluene according to the procedure described in Example 1. There was thus obtained 10 grams of 2-(4-fluorophenacyl)-3-oxo-3,4-dihydro-1,4,2-benzothiazine M.P. 171.1–173.4° C. (corr.).

*Analysis.*—Calc'd for $C_{16}H_{12}FNO_2S$: Nitrogen 4.65; sulfur 10.64. Found: Nitrogen 4.57; sulfur 11.07.

2-(4-fluorophenacyl)-3-oxo-3,4-dihydro-1,4,2-benzothiazine was found to possess antifungal activity as follows:

| Organism | Maximum Effective Dilution | |
|---|---|---|
| | Fungistatic | Fungicidal |
| T. interdigitale | 1:100,000 | 1:66,000 |
| T. mentagrophytes | 1:100,000 | <1:50,000 |
| As. niger | 1:66,000 | <1:50,000 |
| T. gypseum | 1:100,000 | 1:50,000 |
| M. albicans | 1:100,000 | 1:100,000 |

EXAMPLE 18

2-(2,4-dichlorophenacyl)-3-oxo-3,4-dihydro-1,4,2-benzothiazine was prepared from 10 grams of β-(2,4-dichlorobenzoyl)acrylic acid and 5.2 grams of 2-aminobenzenethiol in 150 ml. of dry toluene according to the procedure described in Example 1. There was thus obtained 10 grams of 2-(2,4-dichlorophenacyl)-3-oxo-3,4-dihydro-1,4,2-benzothiazine M.P. 185.6–190.0° C. (corr.).

*Analysis.*—Calc'd for $C_{16}H_{11}Cl_2NO_2S$: Nitrogen 3.98; chlorine 20.13. Found: Nitrogen 3.90; chlorine 20.25.

2-(2,4-dichlorophenacyl)-3-oxo-3,4-dihydro-1,4,2-benzothiazine was found to possess antifungal activity as follows:

| Organism | Maximum Effective Dilution | |
|---|---|---|
| | Fungistatic | Fungicidal |
| T. interdigitale | 1:133,000 | 1:133,000 |
| T. mentagrophytes | 1:133,000 | 1:100,000 |
| As. niger | <1:100,000 | |
| T. gypseum | 1:133,000 | 1:133,000 |
| M. albicans | 1:100,000 | 1:100,000 |

EXAMPLE 19

2-(2,4-dihydroxyphenacyl)-3-oxo-3,4-dihydro-1,4,2-benzothiazine was prepared from 17 grams of β-(2,4-dihydroxybenzoyl)acrylic acid and 10.5 grams of 2-aminobenzenethiol in 200 ml. of dry toluene according to the procedure described in Example 1. The 2-(2,4-dihydroxyphenacyl)-3-oxo-3,4-dihydro-1,4,2-benzothiazine thus obtained weighed 12 grams and had the M.P. 253.4–256.4° C. (corr.).

*Analysis.*—Calc'd for $C_{16}H_{13}NO_4S$: Nitrogen 4.44; sulfur 10.17. Found: Nitrogen 4.37; sulfur 10.14.

EXAMPLE 20

2-(4-methylmercaptophenacyl)-3-oxo-3,4-dihydro-1,4,2-benzothiazine was prepared from 12 grams of β-(4-methylmercaptobenzoyl)acrylic acid and 6.8 grams of 2-aminobenzenethiol in 150 ml. of dry toluene according to the procedure described in Example 1. The 13 grams of 2-(4-methylmercaptophenacyl)-3-oxo-3,4-dihydro-1,4,2-benzothiazine thus obtained had the M.P. 191.4–195.2° C. (corr.).

*Analysis.*—Calc'd for $C_{17}H_{15}NO_2S_2$: Nitrogen 4.25; sulfur 19.46. Found: Nitrogen 4.16; sulfur 19.89.

2-(4-methylsulfonylphenacyl)-3-oxo-3,4-dihydro-1,4,2-benzothiazine can be prepared by oxidizing β-(4-methylmercaptobenzoyl)acrylic acid and reacting the resulting β-(4-methylsulfonylbenzoyl)acrylic acid with 2-aminobenzenethiol; 2-(2-hexylsulfonylphenacyl)-3-oxo-3,4-dihydro-1,4,2-benzothiazine can be prepared by oxidizing β-(2-hexylmercaptobenzoyl)acrylic acid and reacting the resulting β-(4-hexylsulfonylbenzoyl)acrylic acid with 2-aminobenzenethiol; and 2-(4-isobutylsulfonylphenacyl)-3-oxo-3,4-dihydro-1,4,2-benzothiazine can be prepared by oxidizing β-(4-isobutylmercaptobenzoyl)acrylic acid and reacting the resulting β-(4-isobutylsulfonylbenzoyl)acrylic acid with 2-aminobenzenethiol.

According to the manipulative procedures described in the above examples 2-(2-hydroxy-4-methyl-5-chlorophenacyl)-3-oxo-3,4-dihydro-1,4,2-benzothiazine can be prepared by reacting β-(2-hydroxy-4-methyl-5-chlorobenzoyl)acrylic acid with 2-aminobenzenethiol; 2-(4-bromophenacyl)-3-oxo-3,4-dihydro-1,4,2-benzothiazine can be prepared by reacting β-(4-bromobenzoyl)acrylic acid with 2-aminobenzenethiol; 2-(2,5-dimethylphenacyl)-3-oxo-3,4-dihydro-1,4,2-benzothiazine can be prepared by reacting β-(2,5-dimethylbenzoyl)acrylic acid with 2-aminobenzenethiol; 2-(4-hexoxyphenacyl)-3-oxo-3,4-dihydro-1,4,2-benzothiazine can be prepared by reacting β-(4-hexoxybenzoyl)acrylic acid with 2-aminobenzenethiol; 2-(4-iodophenacyl)-3-oxo-3,4-dihydro-1,4,2-benzothiazine can be prepared by reacting β-(4-iodobenzoyl)acrylic acid with 2-aminobenzenethiol; 2-(4-hexylmercaptophenacyl)-3-oxo-3,4-dihydro-1,4,2-benzothiazine can be prepared by reacting β-(4-hexylmercaptobenzoyl)acrylic acid with 2-aminobenzenethiol, the intermediate β-(4-hexylmercaptobenzoyl)acrylic acid can be prepared by reacting hexylmercaptobenzene with maleic anhydride; 2-(3-nitro-4-bromophenacyl)-3-oxo-3,4-dihydro-1,4,2-benzothiazine can be prepared by reacting β-(3-nitro-4-bromobenzoyl)acrylic acid with 2-aminobenzenethiol; and 2-(2-hydroxy-3,5-dibromophenacyl)-3-oxo-3,4-dihydro-1,4,2-benzothiazine can be prepared by reacting β-(2-hydroxy-3,5-dibromobenzoyl)acrylic acid with 2-aminobenzenethiol.

The 2-aroylmethyl-3-oxo-3,4-dihydro-1,4,2-benzothiazines were found to have fungicidal and fungistatic activity when tested in conventional serial dilution tests against various fungi, for example, *Trichophyton interdigitale, Trichophyton mentagrophytes, Trichophyton gypseum, Aspergillus niger* and *Monilia albicans.*

They are preferably employed topically; and they can be compounded with conventional excipients and used in the form of a powder, a liquid, an ointment, a salve, or any other vehicular form suitable for administering antifungal agents. My benzothiazines can be formulated in these various vehicular forms in dilutions of about 1:1000 to about 1:100,000.

I claim:

1. A process for preparing a compound having the formula

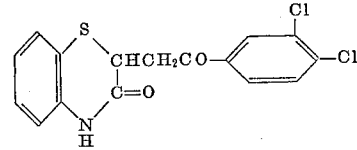

which comprises heating β-(3,4-dichlorobenzoyl)acrylic acid with 2-aminobenzenethiol in an inert solvent at a temperature between about 50° C. to 125° C.

2. A process for preparing a compound having the formula

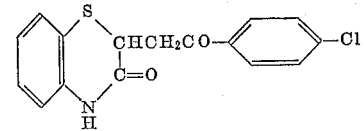

which comprises heating β-(4-chlorobenzoyl)acrylic acid with 2-aminobenzenethiol in an inert solvent at a temperature between about 50° C. to 125° C.

3. A process for preparing a compound having the formula

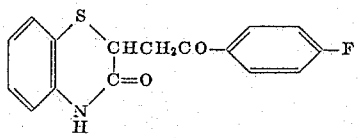

which comprises heating β-(4-fluorobenzoyl)acrylic acid with 2-aminobenzenethiol in an inert solvent at a temperature between about 50° C. to 125° C.

4. A process for preparing a compound having the formula

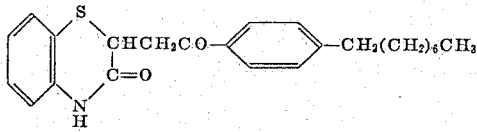

which comprises heating β-(4-n-octylbenzoyl)acrylic acid with 2-aminobenzenethiol in an inert solvent at a temperature between about 50° C. to 125° C.

5. A process for preparing 2-(4-fluorophenacyl)-3-oxo-6-chloro-3,4-dihydro-1,4,2-benzothiazine having the formula

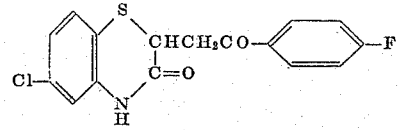

which comprises heating β-(4-fluorobenzoyl)acrylic acid with 4-chloro-2-nitrothiophenol in acetic acid at a temperature between about 50° C. and 125° C. and reacting the resulting 2-(4-chloro-2-nitrophenylmercapto)-3-(4-fluorobenzoyl)propionic acid with a reducing agent effective to reduce nitro groups to amino groups and isolating the 2-(4-fluorophenacyl)-3-oxo-6-chloro-3,4-dihydro-1,4,2-benzothiazine thus produced.

6. 2-(3,4-dichlorophenacyl)-3-oxo-3,4-dihydro - 1,4,2-benzothiazine.

7. 2-(4-chlorophenacyl) - 3-oxo-3,4-dihydro - 1,4,2-benzothiazine.

8. 2-(4-fluorophenacyl)-3-oxo - 3,4-dihydro-1,4,2-benzothiazine.

9. 2-(4-n-octylphenacyl)-3-oxo-3,4 - dihydro - 1,4,2-benzothiazine.

10. 2-(4-fluorophenacyl)-3-oxo-3,4-dihydro-6-chloro-1,4,2-benzothiazine.

11. A process for preparing 2-aroylmethyl-3-oxo-3,4-dihydro-1,4,2-benzothiazine wherein the aryl portion of the aroyl radical is a phenyl radical having from one to three substituents selected from the group consisting of alkyl, lower-alkoxy, lower-alkylmercapto, lower-alkylsulfonyl, amino, lower-acylamino, nitro, hydroxy and halogen, which comprises heating a β-benzoylacrylic acid with 2-aminobenzenethiol in an inert solvent at a temperature between about 50° C. to 125° C.

12. A process for preparing 2-aroylmethyl-3-oxo-3,4-dihydro-1,4,2-benzothiazine wherein the aryl portion of the aroyl radical is dihalogen-substituted phenyl which comprises heating a dihalogen-substituted β-benzoylacrylic acid with 2-aminobenzenethiol in an inert solvent at a temperature between about 50° C. to 125° C.

13. A process for preparing 2-aroylmethyl-3-oxo-3,4-dihydro-6X-1,4,2-benzothiazine wherein the aryl portion of the aroyl radical is a benzene radical and X is a halogen atom which comprises heating a β-benzoylacrylic acid with a 4-halo-2-nitro-thiophenol in acetic acid at a temperature between about 50° C. and 125° C. and reacting the resulting 2-(4-halo-2-nitrophenylmercapto)-3-(aroyl)propionic acid with a reducing agent effective to reduce nitro groups to amino groups and isolating the 2-aroylmethyl-3-oxo-3,4-dihydro-6X-1,4,2 - benzothiazine thus produced.

14. 2-aroylmethyl-3-oxo-3,4-dihydro-6X-1,4,2 - benzothiazine wherein the aryl portion of the aroyl radical is a phenyl radical substituted by from one to three substituents selected from the group consisting of higher alkyl, lower-alkoxy, lower-alkylmercapto, lower-alkylsulfonyl, amino, lower-acylamino, nitro, hydroxy and halogen and X is selected from the group consisting of hydrogen and halogen atoms.

15. 2-aroylmethyl-3-oxo-3,4-dihydro - 1,4,2 - benzothiazine wherein the aryl portion of the aroyl radical is dihalogen-substituted phenyl.

16. 2-aroylmethyl-3-oxo-3,4-dihydro - 1,4,2 - benzothiazine wherein the aryl portion of the aroyl radical is higher-alkyl-substituted phenyl.

References Cited in the file of this patent

Mills et al.: J. Chem. Soc. (1927), pp. 2738 to 2753.
Rogers et al.: J. Chem. Soc., 1947 (part 3), pp. 1619 to 1621.

UNITED STATES PATENT OFFICE

CERTIFICATE OF CORRECTION

Patent No. 2,894,946                                                                 July 14, 1959

Frederick K. Kirchner

It is hereby certified that error appears in the printed specification of the above numbered patent requiring correction and that the said Letters Patent should read as corrected below.

Column 1, line 62, for "adds the" read -- adds to the --; column 3, line 26, for "2-(4-halo-3-nitrophenylmercapto)-3-" read -- 2-(4-halo-2-nitrophenylmercapto)-3- --; column 5, line 18, for "29 grams" read -- 20 grams --.

Signed and sealed this 23rd day of February 1960.

(SEAL)
Attest:

KARL H. AXLINE                                                            ROBERT C. WATSON
Attesting Officer                                                 Commissioner of Patents